United States Patent
Siraux et al.

(10) Patent No.: US 7,696,287 B2
(45) Date of Patent: Apr. 13, 2010

(54) CATALYST GRAIN SIZE

(75) Inventors: Daniel Siraux, Naast (BE); Etienne Laurent, Seneffe (BE)

(73) Assignee: Total Petrochemicals Research Feluy, Feluy (BE)

( * ) Notice: Subject to any disclaimer, the term of this patent is extended or adjusted under 35 U.S.C. 154(b) by 717 days.

(21) Appl. No.: 11/501,178

(22) PCT Filed: Feb. 8, 2005

(86) PCT No.: PCT/EP2005/050522

§ 371 (c)(1), (2), (4) Date: Dec. 26, 2006

(87) PCT Pub. No.: WO2005/082962

PCT Pub. Date: Sep. 9, 2005

(65) Prior Publication Data

US 2007/0185288 A1     Aug. 9, 2007

(30) Foreign Application Priority Data

Feb. 13, 2004   (EP)   ................... 04100585

(51) Int. Cl.
*C08F 2/12* (2006.01)
*C08F 4/643* (2006.01)
*C08F 10/00* (2006.01)

(52) U.S. Cl. ............... 526/64; 526/65; 526/909; 525/52

(58) Field of Classification Search ............... 526/64, 526/909, 65; 525/52
See application file for complete search history.

(56) References Cited

U.S. PATENT DOCUMENTS

| 2,917,465 A | 12/1959 | Begley |
| 2003/0114608 A1 | 6/2003 | Tharappel |
| 2004/0132929 A1* | 7/2004 | Martin et al. ............... 526/64 |
| 2005/0095176 A1* | 5/2005 | Hottovy ............... 422/131 |

FOREIGN PATENT DOCUMENTS

EP   1195388 A1 *   4/2002

* cited by examiner

*Primary Examiner*—Fred M Teskin
(74) *Attorney, Agent, or Firm*—Tenley R. Krueger (57) ABSTRACT

The present invention discloses an olefin polymerisation process carried out in the presence of a Ziegler-Natta catalyst in two liquid full loop reactors connected in series wherein different molecular weight fractions are produced to form a polyolefin, said process being characterized in that the Ziegler-Natta catalyst has a particle size distribution $d_{50}$ of less than 20 μm and greater that 5 μm.

10 Claims, 6 Drawing Sheets

CATALYST GRAIN SIZE

The present invention concerns the use of a catalyst component having controlled grain size to prepare polyolefins and to prevent or reduce defects in products made from these polyolefins. The invention concerns an olefin polymerisation process using a Ziegler Natta-type catalyst.

Olefin polymerisation processes are generally known. Further, it is well known that polymers of olefins can be prepared by olefin polymerisation in a hydrocarbon diluent or in monomers acting as diluents. On an industrial scale, one reactor type, which may be applied in such processes, is a turbulent flow reactor such as a continuous pipe reactor in the form of a loop. However, other types of reactors such as stirred reactors may be used.

Polymerisation is carried out in a loop reactor in a circulating turbulent flow. A so-called loop reactor is well known and is described in the Encyclopaedia of Chemical Technology, $3^{rd}$ edition, vol. 16 page 390. This can produce LLDPE and HDPE resins in the same type of equipment.

The loop reactors may be connected in parallel or in series. In this regard, in a double loop reactor where the two reactors are connected in series, a high molecular weight fraction may be produced in the first loop reactor and a low molecular weight fraction may be produced in the second loop reactor. In this way, a bimodal polymer or a polymer having a broad molecular weight distribution is made. In a double loop reactor where the two reactors are connected in parallel, either a monomodal or a bimodal product is made.

EP0649860, the contents of which are incorporated herein by reference, describes a process for producing polyethylene in two liquid full loop reactors, connected in series.

The ethylene is injected with the comonomer in the first loop reactor as well as the catalytic system (i.e. the catalyst precontacted with the activating agent). Suitable comonomers, which can be used, include alpha-olefins with from 3 to 10 atoms of carbon, preferably 1-hexene. Polymerisation is done at a temperature of between 50 and 120° C., preferably between 60 and 110° C., and at a pressure between 1 and 100 bars, preferably between 30 and 50 bars.

The flow of ethylene polymer obtained in the first reactor is transferred into the second reactor by means of one or more settling legs of the first reactor, for example by using two settling legs (each being filled independently with the suspension coming from the reactor, the solids being concentrated by gravity settling and discharge).

In any olefin polymerisation process, the polyolefin is produced in the reactor in the presence of an olefin polymerisation catalyst. Such catalysts generally may be classified into three groups: metallocene-type catalysts, chromium-type catalysts and Ziegler-Natta-type catalysts. Typically, the catalyst is used in particulate form. The polyolefin is produced as a resin/powder (often referred to as "fluff") with a hard catalyst particle at the core of each grain of the powder. The "fluff" is removed from the reactor and must be extruded before it is sold. Typically, an extruder works by melting and homogenising the "fluff" and then forcing it through holes before cutting to form pellets.

The pellets then may be transformed by subjection to further processing in applications such as pipe making, fibre making, and blow-molding.

In processes where the catalyst used in the olefin polymerisation is a Ziegler-Natta-type catalyst, the present inventors have become aware that defects sometimes are visible in the finished product. In p articular, the present inventors have become aware that dots or specks and/or rough patches sometimes are visible on the surface of a pipe made from pellets of a bimodal product that were produced using a Ziegler-Natta or metallocene catalyst. Such defects can make the pipe weaker and can affect the free flow of liquid through the pipe.

The present inventors have recognized that these defects likely occur because of homogenisation problems in the extruder. As such, attempts have been made to try to prevent or reduce these defects. In particular, efforts have been concentrated on optimising the specific energy delivered to the extruder. However, this has not proved an entirely satisfactory solution to the problem.

In view of the above, there remains a need to provide a new olefin polymerisation process for making polyolefin resin and, subsequently polyolefin pellets, wherein defects in any product that is produced from the polyolefin pellets are prevented or reduced.

Accordingly, the present invention discloses a process for polymerising olefin that is carried out in the presence of a Ziegler-Natta catalyst system in two liquid full loop reactors connected in series wherein different molecular weight fractions are produced, characterised in that the Ziegler-Natta catalyst has a particle size distribution $d_{50}$ of less than 20 μm and greater than 5 μm.

The present invention also discloses a polyolefin obtainable by the process according to the present invention.

The present invention further discloses the use of a polyolefin formed by the process according to the present invention for making pipes, particularly for making a water or gas (such as liquid propane or natural gas) pipe distribution network.

The present invention yet further discloses a pipe and a distribution pipe network prepared from the polyolefins of the present invention.

Clearly, in the process according to the present invention, the catalyst necessarily is in particulate form.

The catalyst's particle size distribution (PSD) $d_{50}$ is measured by laser diffraction analysis on a Malvern type analyser (Malvern 2000S) after having put the catalyst in suspension in cyclohexane. The particle size distribution d50 is defined as the particle size for which fifty percent by volume of the particles has a size lower than the d50.

The fluff particle size distribution (PSD) $d_{50}$ is measured according to ASTM method D 1921-89 and is defined as the particle size for which fifty percent by weight of the particles has a size lower than the d50.

The particle size distribution of the catalyst used in the present process is lower than previously used in olefin polymerisation processes.

It was expected that by using a smaller catalyst size a correspondingly smaller resin particle would be obtained.

In this regard, it has been thought previously in this art that a smaller resin particle size would be disadvantageous because it in fact was thought that it would be more difficult to homogenize the resulting polyolefin because smaller resin grains would not flow as easily through the extruder. It was also expected that smaller resin particles would result in a lower settling efficiency.

By using a smaller catalyst particle size, the size of the grains in the produced polyolefin resin ("fluff") also is smaller. This has been found to have the benefit of improved and easier homogenisation during extrusion because the "fluff" is able to be made fully molten.

Other advantages of a smaller resin particle size also have been found unexpectedly. These include:

Improved unit throughput in the process. The smaller resin particles pack together more efficiently in the settling legs. This means that less diluent and more solid resin product is removed per unit volume. This effect may be attributed to improved "fluff" bulk density (BD) which gives higher settled "fluff" mass in the reactor legs (Bulk density is measured following the method of standard test ASTM D 1895).

Comonomer (for example hexene) incorporation is improved because a lower amount of comonomer is necessary to obtain an equivalent density.

Lower pump power consumption to circulate the solids in the reactor.

Resin product can remain in the reactor for longer. This is because higher solids levels can be maintained in the reactor with the same power consumption on the circulation pump. A higher fluff residence time enables an improvement in the catalyst yield. In other words, more product is produced per kg of catalyst.

One way of indirectly measuring the "fluff" bulk density is by obtaining the ratio of diluent to monomer injected into the reactor. This is measured at the reactor feeds. AS such, where the diluent is isobutane and the polymer is polyethylene, a ratio isobutane:ethylene can be obtained as an indication of the fluff settling efficiency. This ratio substantially is not effected by decreasing the $d_{50}$ of the catalyst. This is because the lower $d_{50}$ of the "fluff" is compensated by the higher settled "fluff" mass in the reactor legs (due to an improved "fluff" bulk density). Also, it has been found that the level of fines present in the "fluff" is not disadvantageously higher when using a catalyst with a lower $d_{50}$.

The present inventors have found that when using a smaller catalyst particle size, the size of the produced resin particle is not as small as expected. This is because the resin particle size in fact depends on two factors. These are: (1) the catalyst particle size and (2) the catalyst productivity. Unexpectedly, it has been found that productivity is increased when the catalyst particle is made smaller. As such, a smaller difference in resin particle size is observed than was expected (because it was expected that productivity would remain the same).

To exemplify the increase in productivity, it can be reported that, previously, 1 g of catalyst (particle size 23 μm) produced 5,000-10,000 g of resin. It has now been found that 1 g of catalyst (particle size 13 μm) produces 20,000 g of resin. As such, the present invention also provides a process wherein the catalyst has an improved productivity. Increased productivity means a lower catalyst cost per unit resin.

Preferably, the catalyst has a $d_{50}$ of less than 15 μm.

Preferably, the catalyst has a $d_{50}$ of greater than 8 μm.

Most preferably, the catalyst has a $d_{50}$ of about 13 μm.

Desirably, the polyolefin resin made by the present process has a particle size distribution of less than 500 μm, more desirably about 400 μm. This can be compared with previously known processes where the polyolefin may have had a particle size distribution of greater than 600 μm.

Generally, Ziegler-Natta type catalysts usable in the present process comprise a transition metal compound (compound A) of Group IV-VIII (mainly Ti or V) supported on a carrier. Such catalysts are well known in the art. Examples of Ziegler-Natta catalysts are $TiCl_4$, $TiCl_3$, $VCl_4$, $VOCl_3$. An $MgCl_2$ support is preferred.

Preferably, the Ziegler-Natta catalyst comprises from 10 to 18% Mg by weight and from 3 to 10% Ti by weight. More preferably, the Ziegler-Natta catalyst comprises about 13% Mg by weight and about 7% Ti by weight.

It will be understood in the present process that, where necessary, an activating agent will be needed to activate the catalyst. Suitable activating agents, where needed, are well known in this art. Suitable activating agent s include organo-metallic or hydride compounds of Group I to III, for example oregano-aluminium compounds such as those of general formula $AlR_3$, $R\mu_2AlCl$ or $R\mu\mu_3Al_2Cl_3$ in which R, Rμ, and Rμμ each independently is a hydrocarbon radical, preferably an alkyl group with 1 to 16 carbon atoms, preferably from 2 to 12 carbon atoms. Suitable activating agents include, for example $Et_3Al$, $Et_2AlCl$, and $(i-Bu)_3Al$. One preferred activating agent is triisobutylaluminium.

Typically the polymerisation process will be carried out in a hydrocarbon diluent. One suitable diluent is isobutane. A separate catalyst diluent may be required.

Suitable catalyst diluents will be known to those skilled in this art.

Preferably, the present process is used to make an ethylene or propylene, homopolymer or copolymer.

Also, preferably the present process is used to make a polymer (for example polyethylene) having a broad molecular weight distribution, such as a bimodal polymer such as bimodal polyethylene. The molecular weight distribution (MWD) can be fully described by means of the graph obtained by gel permeation chromatography. However, the molecular weight distribution can be generally described by a figure which represents the ratio between the mean molecular weight by weight and the mean molecular weight by number (the polydispersity index). Depending on the applications, the molecular weight distribution required may vary from 10 to 30, preferably of from 12 to 24.

More preferably, the process is used to make a polymer (for example polyethylene) having a typical molecular weight distribution of greater than 15.

Preferably, hydrogen is used to control the molecular weight of the polymer. A higher pressure of hydrogen leads to a lower mean molecular weight.

Any suitable reactors can be used, for example one or more loop reactors and/or one or more continuously stirred reactor. Preferably the present process is carried out in a two-reactor system wherein at least one reactor is a loop reactor.

Preferably, the process for producing polyethylene is carried out in two liquid full loop reactors (a "double loop" reactor) as referred to above.

In this regard, it is preferable that the present process is carried out in accordance with the process of EP 0649860, as described above.

Preferably a low concentration of hydrogen is maintained in the first reactor, for instance between 0 and 0.1% by volume, and a high concentration of hydrogen in the second reactor, for instance between 0.5 and 2.4% by volume.

Where a double loop reactor is used, preferably the polymers formed in the first reactor have an HLMI (high load melt index according to ASTM standard D1238, 190° C./21.6 kg) between 0.01 and 5 grams per 10' preferably between 0.1 and 2 grams per 10'. Preferably, the final polymers have an HLMI higher than 5 grams per 10'.

The properties of the resin are however selected according to the end use of the polymer. Typical properties of resins suitable respectively for pipe, blow-molding or film applications are summarized in Table 1

TABLE 1

| | Use | | | | | |
|---|---|---|---|---|---|---|
| | PIPE | | BLOW-MOULDING | | FILM | |
| | range | typical | range | typical | range | typical |
| density g/cc | 0.948-0.961 | 0.950 0.959[a] | | | | |
| MI2 g/10' | nm | nm | nm | 0.25 | nm | nm |

TABLE 1-continued

| | Use | | | | | |
|---|---|---|---|---|---|---|
| | PIPE | | BLOW-MOULDING | | FILM | |
| | range | typical | range | typical | range | typical |
| MI5 g/10' | 0.18-0.38 | 0.28 | | | 0.1-0.5 | 0.4 |
| HLMI g/10' | 5-12 | 8 | 2-70 | 25 | 4-13 | 10 |
| D = Mw/Mn | 12-24 | 20 | 12-20 | 15 | 15-24 | 20 |

$^a$for black grades, the density is higher than for uncoloured resin
nm: means not measurable or smaller than 0.001 g/10 mm.

MI2, MI5 and HLMI are measured following the methods of standard test ASTM D 1238 at a temperature of 190° C. and under a load respectively of 2.16 kg, 5 kg and 21.6 kg.

A preferred reaction temperature range in the present process may be said to be from 60 to 120, more preferably from 75 to 100° C.

A preferred applied pressure range may be said to be from 30 to 55 bars, more preferably from 40 to 50 bars.

The reactor pressure to some extent controls the quantity of slurry that is taken out of the reactor.

One embodiment of a "double loop" reactor process can be described as follows:

The process is a continuous process. A monomer (e.g. ethylene polymerizes in a liquid diluent (e.g. isobutane) in the presence of a comonomer (e.g. hexene), hydrogen, catalyst, activating agent and anti-fouling agent. The slurry is maintained in circulation by an axial pump consisting in a reactor essentially of vertical jacketed pipe sections connected by trough elbows. The polymerisation heat is extracted by a water-cooling jacket. The reactor line includes two reactors that can be used in parallel or in series. The approximate volume of the reactors may be about 100 m$^3$.

The product (e.g. polyethylene) is taken out of the reactor with some diluent through settling legs and discontinuous discharge valves. A small fraction of the total circulating flow is withdrawn. It is moved to a polymer degassing section in which the solid content is increased.

While being depressurized, the slurry is transferred through heated flash lines to a flash tank. In the flash tank, the product and diluent are separated. The degassing is completed in a purge column.

The powder product is transported under nitrogen to fluff silos and extruded into pellets along with some specific additives. A pellet treatment unit comprising silos and hot and cool air flow allows the removal of residual components from the pellets. The pellets then are directed to homogenisation silos before final storage.

The gas coming out from the flash tank and from the purge column is treated in a distillation section. This allows the separate recovery of diluent, monomer and comonomer.

This embodiment of the double loop reactor process in fact would be usable with chromium type, Ziegler-Natta type or indeed metallocene catalysts. Each catalyst type would have a specific injection system.

EXAMPLES AND EXPERIMENTS

An evaluation was carried out in order to compare a catalyst having a particle size distribution $d_{50}$ of 23 μm with a catalyst having a particle size distribution $d_{50}$ of 13 μm.

The evaluation was carried out in a double loop reactor and was divided into four time frames as explained below:
  I. Polyethylene production using the standard 23 μm catalyst in a "double loop" reactor.
  II. Polyethylene production using 13 μm catalyst.
  III. Polyethylene production using 13 μm catalyst at maximal reactor throughput.
  IV. Polyethylene production using standard 23 μm catalyst.

EXPERIMENTAL DETAIL

Figure 1:
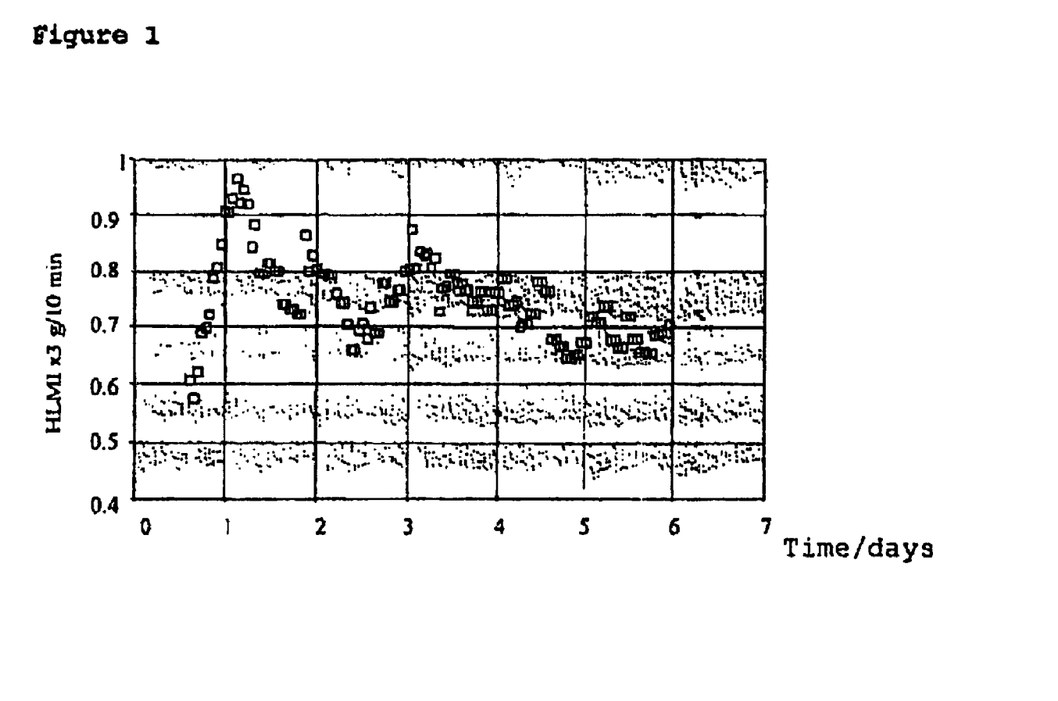
FIG. 1 represents the melt index HLMI expressed in dg/min as a function of time expressed in days for the 13 μm particles in reactor 1 at the beginning of the evaluation.
Figure 2:
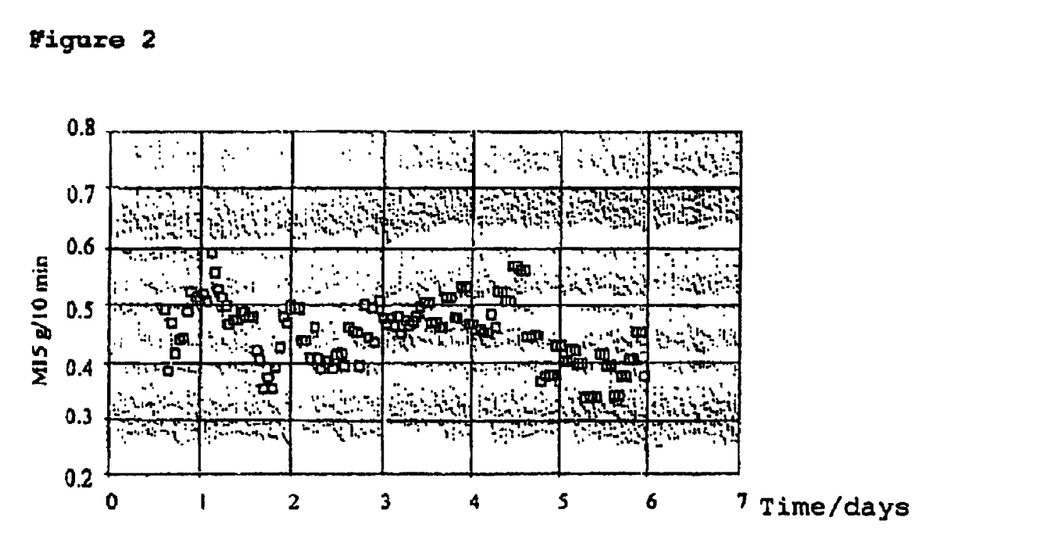
FIG. 2 represents the melt index MI5 expressed in dg/min as a function of time expressed in days in reactor 2 for the 13 μm particles at the beginning of the evaluation.
Figure 3:
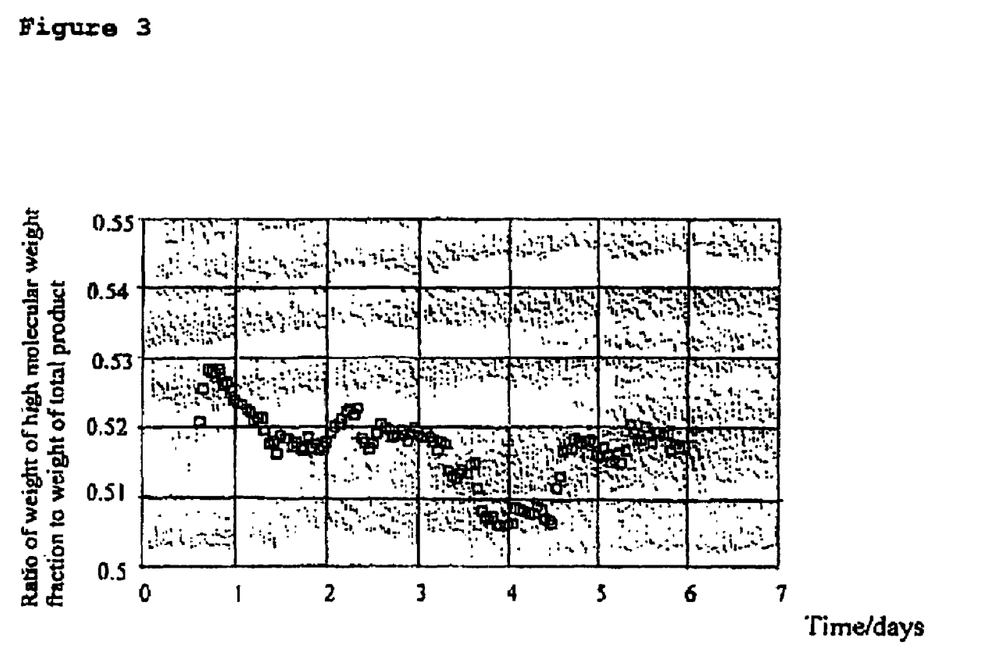
FIG. 3 represents the reactor rate expressed as the ratio of high molecular weight fraction to total production as a function of time expressed in days for the 13 μm particles at the beginning of the evaluation.

The conditions have been adjusted to obtain equivalent Reactor 1 melt index and reactor ratio for the 13 μm and 23 μm catalysts. (See FIG. 1, FIG. 2 & FIG. 3).

Influence of Fluff Morphology on Reactor throughput

Figure 4:
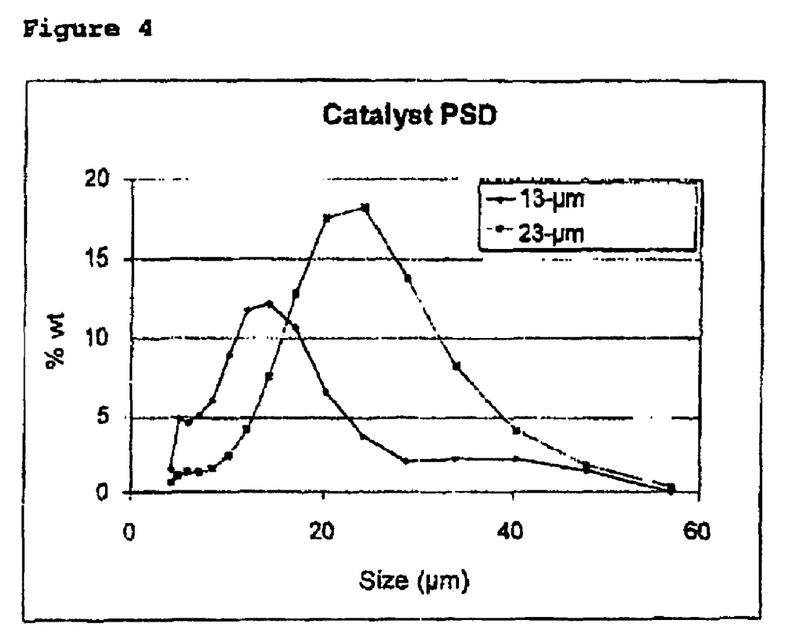
FIG. 4 represents the particle size distribution (PSD) expressed in wt % as a function of particle size expressed in microns.
Figure 5:
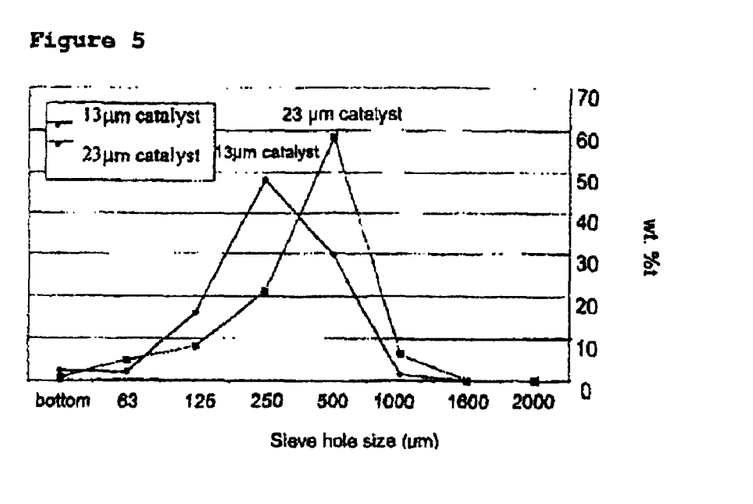
FIG. 5 shows a comparison between the 13 microns and 23 microns fluff PSD.

The particle size distribution (PSD) of 13-μm and 23-μm catalysts are given in FIG. 4. The polyethylene fluff PSD was lower when the 13 μm catalyst was us ed (See FIG. 5).

Figure 6:
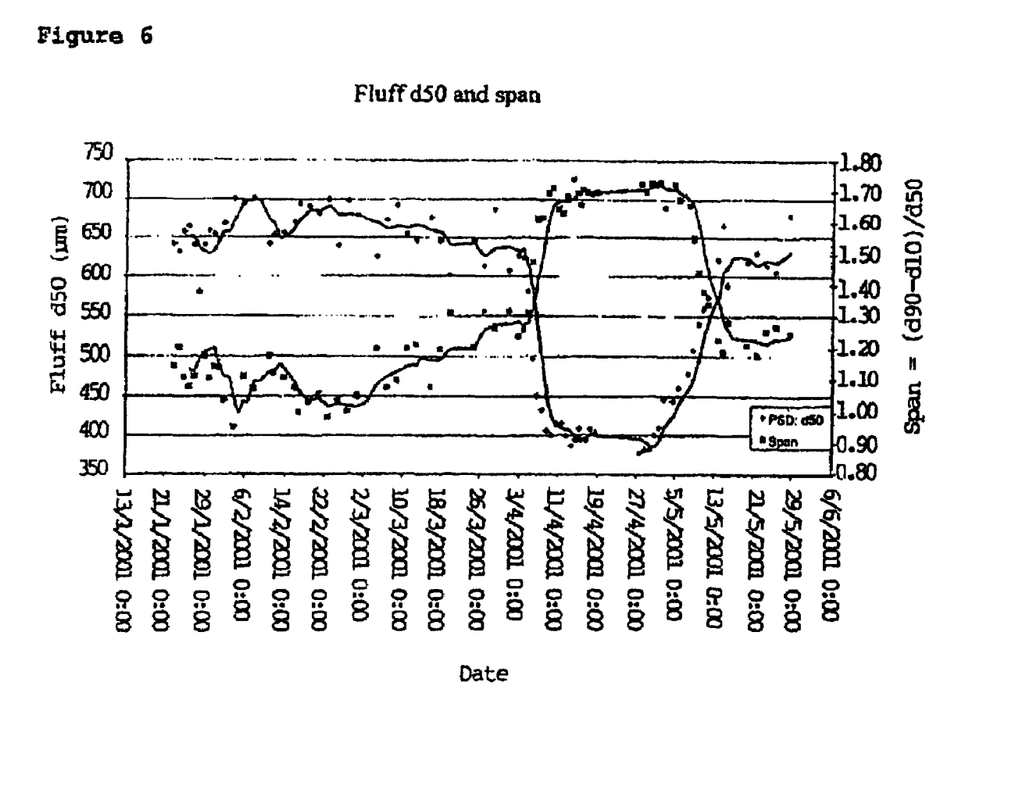
FIG. 6 shows the fluff's $d_{50}$ expressed in microns and the span evolution expressed as the ratio $(d_{90}-d_{10})/d_{50}$ as a function of time expressed as the date of experiment.

The $d_{50}$ is reduced from about 625 μm down to 400 μm. The higher span $[(d_{90}-d_{10})/d_{50}]$ is due to the lower $d_{50}$, the PSD broadness being about the same (See FIG. 6).

Figure 7:
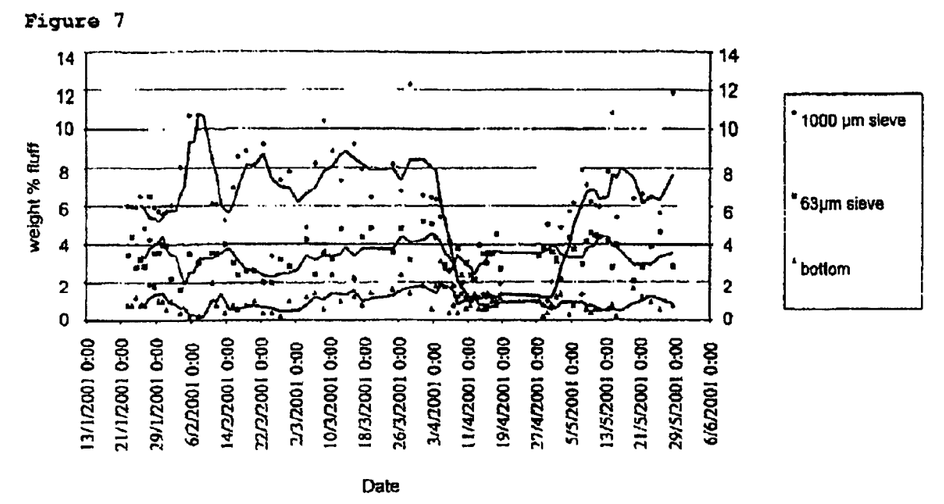
FIG. 7 represents the weight percent of fluff after respectively the 1000 microns, 63 microns and bottom sieves as a function of time expressed as the date of experiment.

FIG. 7 shows that the 13 μm catalyst generates a smaller quantity of large fluff particles (about 1% instead of 6-8% using 23 μm catalyst) but produces the same quantity of fines (bottom and 63 μm sieves). This fluff morphology should be advantageous, when the product is used in pipe-making, for the improvement of the inner aspect of the pipe product.

Figure 8:
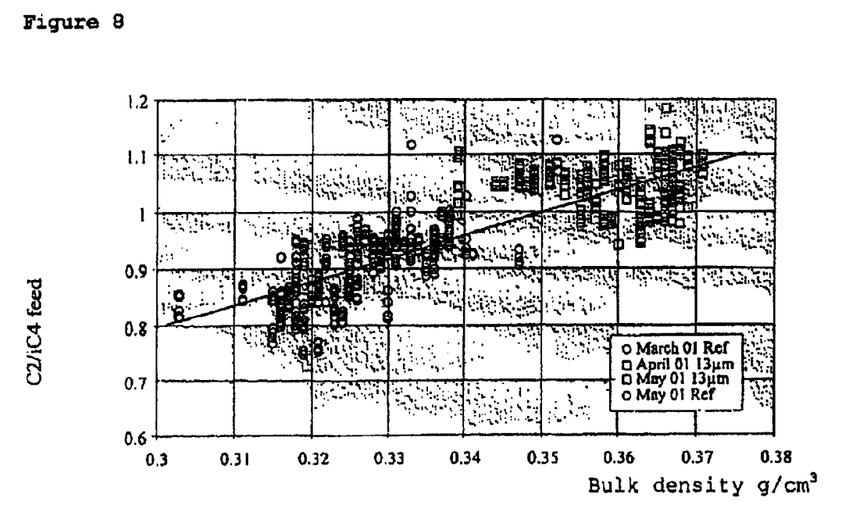
FIG. 8 is a plot of the ratio C2/iC4 in the feed vs bulk density expressed in g/cm$^3$ of the polymer fluff in reactor 1.
Figure 9:
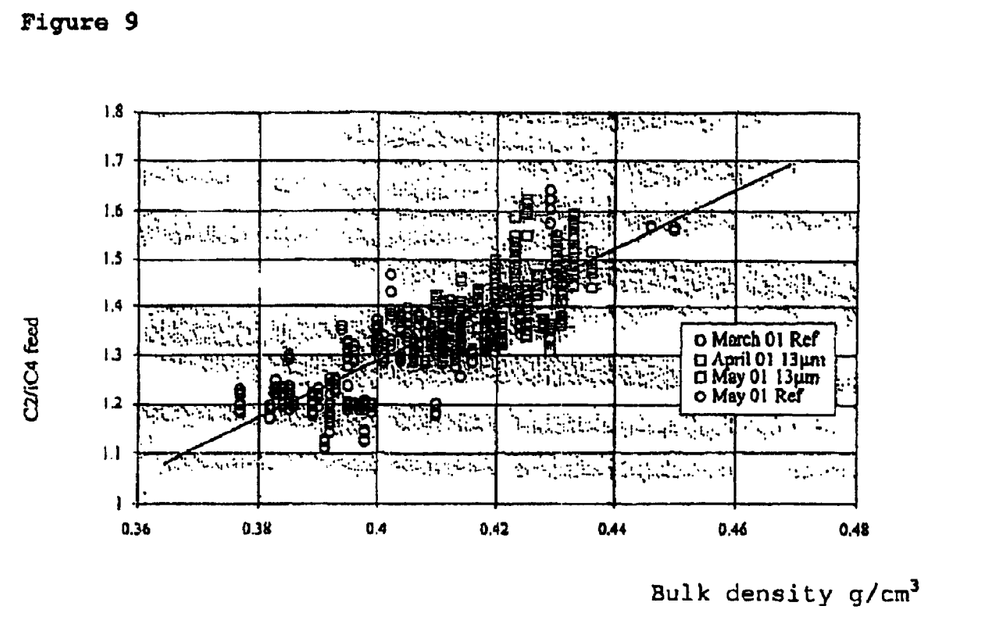
FIG. 9 is a plot of the ratio C2/iC4 of the feed vs bulk density expressed in g/cm$^3$ of the polymer fluff in reactor 2.

Despite the lower fluff $d_{50}$ coming from the 13 μm catalyst, the reactor throughput was maintained due to a significant improvement of the bulk density observed in Reactor 1 and Reactor 2 (see FIG. 8 and FIG. 9). This higher bulk density had an important impact on the settling efficiency.

Figure 10:
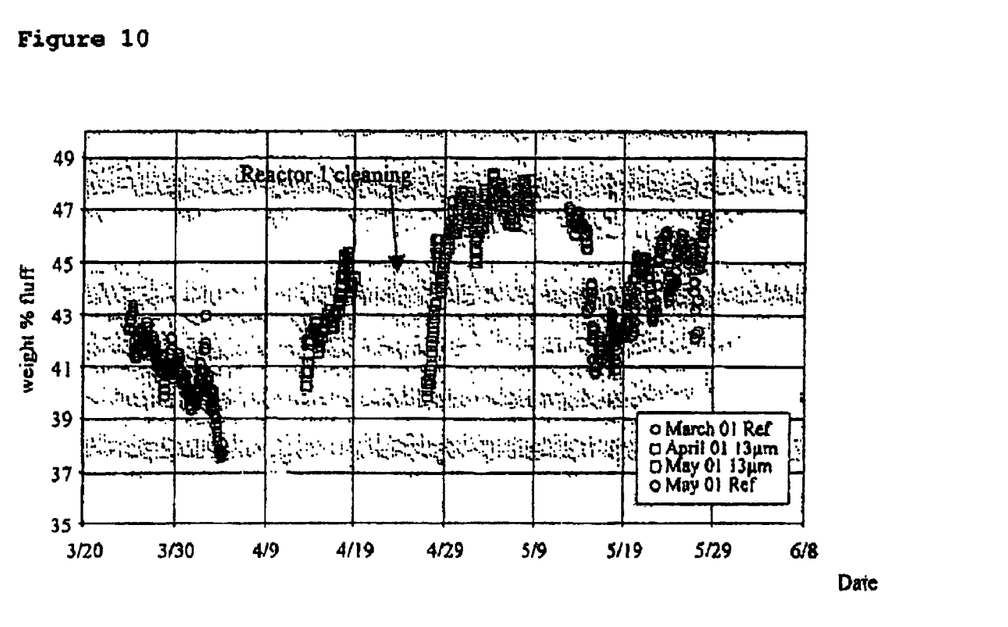
FIG. 10 represents the solid content expressed in weight percent of fluff as a function of time expressed as the date of experiment.
Figure 11:
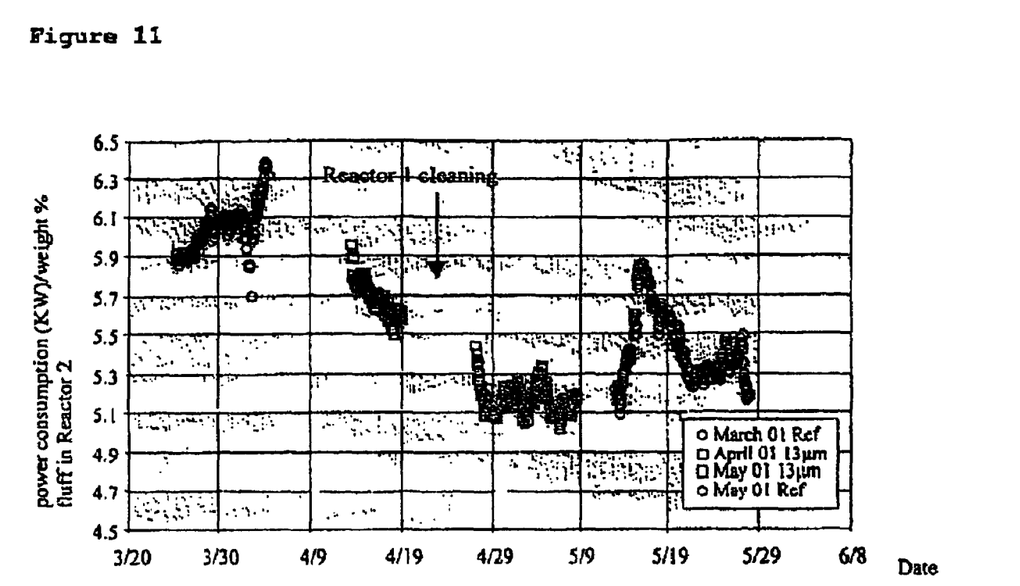
FIG. 11 represents the pump power consumption expressed in kw per weight percent of fluff as a function of time expressed as the date of experiment.

It was observed that:

Owing to the lower pump power consumption for the lower fluff particle size using 13-μm catalyst, it was possible to raise the solids content in Reactor 1 and, in this way, increase the solids residence time (See FIG. 10 and FIG. 11) and thus the productivity.

The 13 μm catalyst has the same hydrogen response as the 23 μm catalyst whereas the comonomer incorporation of the 13 μm catalyst is better than that of the 23 μm catalyst.

Figure 12:
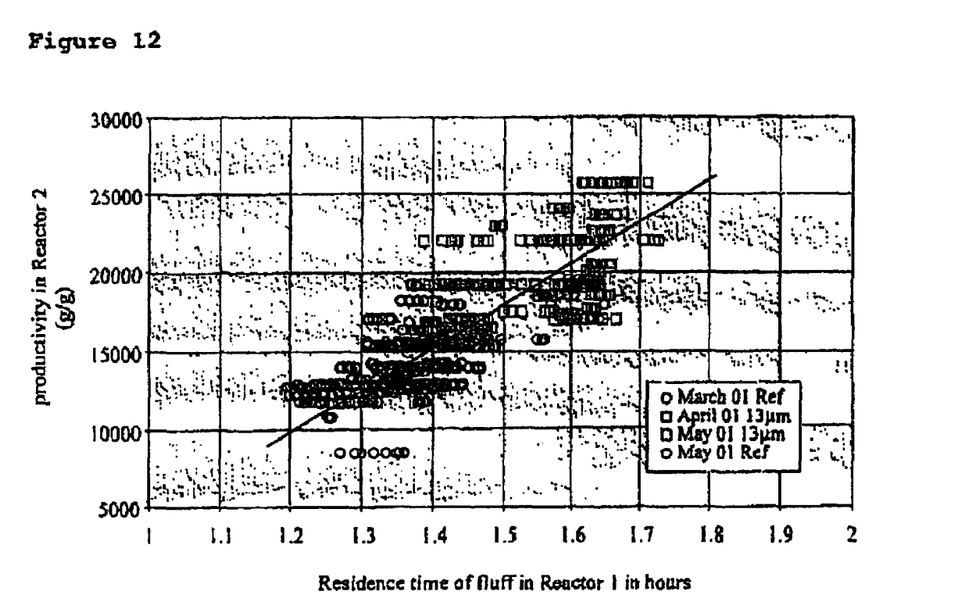
FIG. 12 shows the productivity expressed in g/g as a function of solid residence time expressed in hours.

Taking into account the solids residence time and the ethylene off-gas, the activity of 13-μm catalyst is 20-30% higher to the activity of 23-μm catalyst (See FIG. 12).

The molecular weight distribution is the same for both catalyst grain sizes.

Despite the lower fluff d50 (400 μm instead of 625 μm), the reactor throughput was not penalized thanks to the improvement of fluff bulk density (+0.04) generating good settling and high solids in both reactors.

The lower fluff d50 is due to a lower amount of big particles (1000 μm), the amount of fines (<63 μm) being the same or even lower. This is interesting in terms of settling efficiency and pipe aspect.

The invention claimed is:

1. A method for the polymerization of an olefin in a double loop reactor system having first and second interconnected loop reactors comprising:
   a) introducing an olefin monomer, and a diluent carrier liquid into a first loop reactor of said reactor system;
   b) supplying to said first loop reactor a polymerization catalyst system comprising a first supported Ziegler-Natta catalyst component having a particle size distribution d50 within the range of greater than 5 μm to less than 20 μm;
   c) circulating said diluent liquid and olefin monomer through said first loop reactor while polymerizing said olefin monomer in the presence of said first catalyst system to produce a slurry of polymer fluff particles in said diluent carrier liquid;
   d) withdrawing said slurry from said first loop reactor and supplying said withdrawn slurry to said second loop reactor;
   e) introducing an olefin monomer and a diluent carrier liquid into said second loop reactor;
   f) introducing into said second loop reactor a second Ziegler-Natta catalyst system comprising a supported second Ziegler-Natta catalyst component having a particle size distribution d50 within the range of greater than 5 μm to less than 20 μm separately from the introduction of the first polymerization catalyst system to said first loop reactor in subparagraph b);
   g) circulating said diluent liquid and olefin monomer through said second loop reactor while polymerizing said olefin monomer in the presence of said second catalyst system to produce a slurry of olefin polymer particles in said diluent liquid in said second reactor; and
   h) recovering said olefin polymer from said second loop reactor.

2. The method of claim 1 wherein said Ziegler-Natta catalyst component has a particle size distribution d50 of less than 15 μm.

3. The method of claim 2 wherein said Ziegler-Natta catalyst component has a particle size distribution d50 of greater than 8 μm.

4. The method of claim 2 wherein said Ziegler-Natta catalyst component has a particle size distribution d50 of about 13 μm.

5. The method of claim 1 wherein said olefin is ethylene and the olefin polymer recovered from said second loop reactor is an ethylene homopolymer or copolymer.

6. The method of claim 5 further comprising introducing a comonomer along with said ethylene monomer wherein said comonomer is an alpha olefin having from 3-10 carbon atoms.

7. The method of claim 5 wherein the olefin polymer recovered from said second loop reactor has a particle size distribution of less than 500 μm.

8. The method of claim 7 wherein said olefin polymer has a particle size distribution of less than 400 μm.

9. The method of claim 1 wherein said Ziegler-Natta catalyst component is a titanium or vanadium chloride supported on a magnesium dichloride support.

10. The method of claim 9 wherein said Ziegler-Natta catalyst component is a titanium chloride on a magnesium dichloride support and comprises from 3-10 weight percent titanium and from 10-18 weight percent magnesium.

* * * * *